(12) United States Patent
Hackl et al.

(10) Patent No.: US 10,569,744 B2
(45) Date of Patent: Feb. 25, 2020

(54) WINDSHIELD WIPER DEVICE

(71) Applicant: Robert Bosch GmbH, Stuttgart (DE)

(72) Inventors: Viktor Hackl, Sopron (HU); Peter Deak, Budapest (HU); Martin Steinmetz, Korntal-Muenchingen (DE); Michael Weiler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 15/537,852

(22) PCT Filed: Nov. 30, 2015

(86) PCT No.: PCT/EP2015/078044
§ 371 (c)(1),
(2) Date: Jun. 19, 2017

(87) PCT Pub. No.: WO2016/096383
PCT Pub. Date: Jun. 23, 2016

(65) Prior Publication Data
US 2017/0349149 A1 Dec. 7, 2017

(30) Foreign Application Priority Data
Dec. 19, 2014 (DE) .................. 10 2014 226 511

(51) Int. Cl.
*B60S 1/40* (2006.01)
*B60S 1/34* (2006.01)
(Continued)

(52) U.S. Cl.
CPC ............. *B60S 1/4048* (2013.01); *B60S 1/345* (2013.01); *B60S 1/3452* (2013.01);
(Continued)

(58) Field of Classification Search
CPC ...... B60S 2001/3812; B60S 2001/3813; B60S 2001/3815; B60S 2001/3825; B60S 1/38;
(Continued)

(56) References Cited

U.S. PATENT DOCUMENTS

| 3,480,986 A | * | 12/1969 | Forster | ...................... B60S 1/32 |
| | | | | 15/250.32 |
| 2013/0097799 A1 | * | 4/2013 | Friscioni | ............... B60S 1/3436 |
| | | | | 15/250.32 |
| 2016/0159322 A1 | * | 6/2016 | Weiler | .................. B60S 1/3411 |
| | | | | 15/250.32 |

FOREIGN PATENT DOCUMENTS

CN 201827148 U 5/2011
DE 10040129 * 6/2002
(Continued)

OTHER PUBLICATIONS

Machine translation of description portion of Korean publication 10-0782794, published Nov. 2007. (Year: 2007).*
(Continued)

*Primary Examiner* — Gary K. Graham
(74) *Attorney, Agent, or Firm* — Michael Best & Friedrich LLP

(57) ABSTRACT

The invention relates to a windshield wiper device (100) for a vehicle, having a fastening element (32) and a mounting unit (110) configured to be mounted to the fastening element (32), wherein the mounting unit (110) has a first engagement means (116). The windshield wiper device (100) comprises a wiper blade (2) having a longitudinal extension (8), wherein on the wiper blade side, the wiper blade (2) is provided with a fastening part (120) having a second engagement means (124). The mounting unit (110) and the fastening part (120) on the wiper blade side can be inserted into each other, at least partially, by a movement substantially along the longitudinal extension (8) of the wiper blade
(Continued)

(2). The first engagement means (116) and the second engagement means (124) are designed to engage with one another, whenever the mounting unit (110) and the fastening part (120) on the wiper blade side are inserted into each other. The engagement between the first engagement means (116) of the mounting unit (110) and the second engagement means (124) of the fastening part (120) on the wiper blade side can be released.

16 Claims, 7 Drawing Sheets

(51) Int. Cl.
*B60S 1/38* (2006.01)
*B60S 1/42* (2006.01)

(52) U.S. Cl.
CPC ........... *B60S 1/3463* (2013.01); *B60S 1/3801* (2013.01); *B60S 1/42* (2013.01); *B60S 1/40* (2013.01); *B60S 2001/3812* (2013.01); *B60S 2001/3825* (2013.01); *B60S 2001/4054* (2013.01)

(58) Field of Classification Search
CPC ........ B60S 1/3436; B60S 1/3801; B60S 1/34; B60S 1/342; B60S 1/3445; B60S 1/345; B60S 1/3452; B60S 1/3454; B60S 1/4048; B60S 1/3475; B60S 1/3477; B60S 1/3463; B60S 1/3465; B60S 2001/4054; B60S 1/40
USPC ........... 15/250.32, 250.34, 250.351, 250.352
See application file for complete search history.

(56) References Cited

FOREIGN PATENT DOCUMENTS

| DE | 102005048344 | | 4/2007 |
|----|---|---|---|
| DE | 102011078095 | | 12/2012 |
| DE | 102011078108 | | 12/2012 |
| DE | 102013214064 | | 5/2014 |
| EP | 2143602 | | 1/2010 |
| FR | 2487758 | * | 2/1982 |
| FR | 2995850 | * | 3/2014 |
| KR | 10-0782794 | * | 12/2007 |
| WO | WO2012065639 | | 5/2012 |
| WO | 2013170877 A1 | | 11/2013 |

OTHER PUBLICATIONS

International Search Report for Application No. PCT/EP2015/078044 dated Feb. 17, 2016 (English Translation, 3 pages).

* cited by examiner

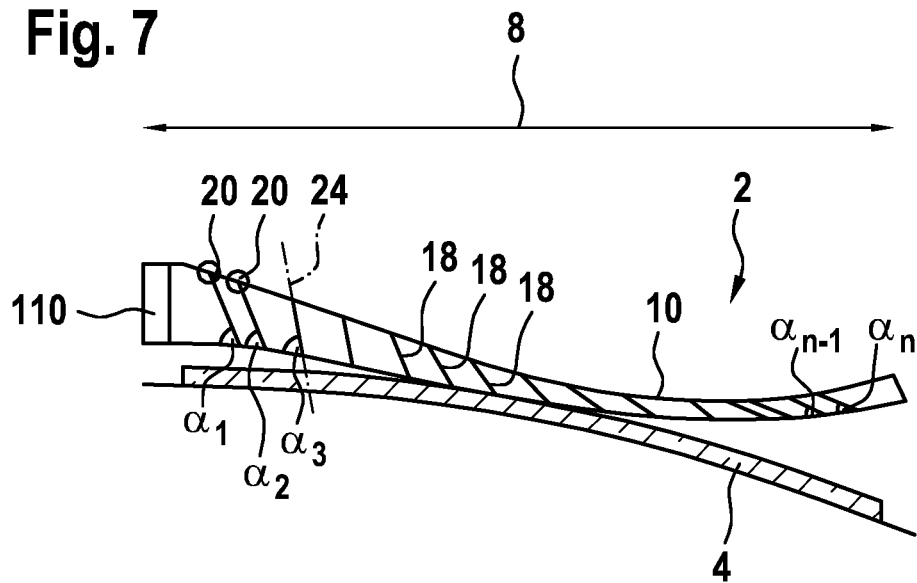
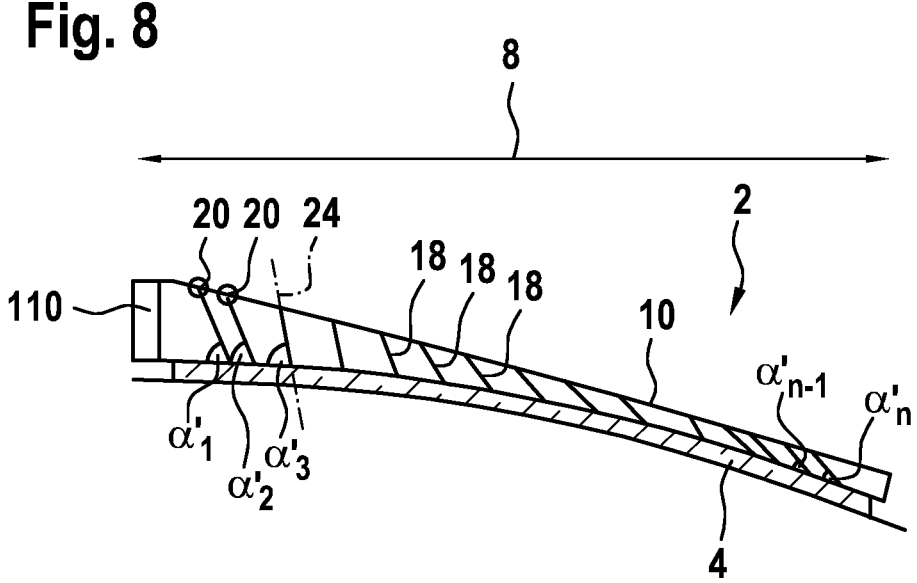

WINDSHIELD WIPER DEVICE

BACKGROUND OF THE INVENTION

The invention relates to a windshield wiper device for a vehicle, in particular a motor vehicle. Furthermore, the invention relates to a method for mounting a windshield wiper device, and relates to a method for dismantling a windshield wiper device.

Windshield wiper devices typically have a wiper arm or wiper lever, a wiper blade being moved on the window of a motor vehicle. Here, the wiper blade is moved between a first reversing position and a second reversing position. For this purpose, the wiper arm is connected via a drive shaft to a wiper motor.

In the case of the improvement of windshield wiper devices, there are a plurality of boundary conditions which should be taken into consideration. They include the complexity during the manufacture and/or the manufacturing costs, the material costs, but also the properties of the windshield wiper device, in particular the function under a wide variety of conditions and the durability under a multiplicity of conditions.

Wear phenomena which are associated with a deterioration of the wiping quality usually occur in the case of windshield wiper devices, in particular in the case of wiper blades, as a result of their regular use. Moreover, as a result of the exposed position of windshield wiper devices on the front or rear window of motor vehicles, in particular when passing through a car wash, there is the risk that the windshield wiper device is damaged or even torn off. It is necessary in these cases to replace the worn or damaged windshield wiper devices. The replacement of windshield wiper devices is conventionally relatively complicated, since they are usually fastened to the drive shaft via screw connections.

SUMMARY OF THE INVENTION

It is the object of the present invention to provide a windshield wiper device, a method for mounting a windshield wiper device, and a method for dismantling a windshield wiper device, by way of which at least one or a plurality of the abovementioned disadvantages are reduced or substantially do not occur.

According to one aspect of the present invention, a windshield wiper device is proposed for a vehicle, in particular a motor vehicle, having a fastening element and a mounting unit which is designed for being mounted on the fastening element, the mounting unit having a first engagement means. The windshield wiper device comprises a wiper blade with a longitudinal extent, the wiper blade having a wiper blade-side fastening part with a second engagement means, it being possible for the mounting unit and the wiper blade-side fastening part to be introduced at least partially into one another by way of a movement substantially along the longitudinal extent of the wiper blade, the first engagement means and the second engagement means being designed for engaging into one another when the mounting unit and the wiper blade-side fastening part are introduced into one another, and wherein the engagement between the first engagement means of the mounting unit and the second engagement means of the wiper blade-side fastening part is releasable.

According to another aspect of the present invention, a method is provided for mounting a windshield wiper device in accordance with the embodiments which are described here. The method comprises introducing the mounting unit and the wiper blade-side fastening part at least partially into one another by way of a movement substantially along the longitudinal extent of the wiper blade; and formation of a non-positive connection and/or positively locking connection between the first engagement means and the second engagement means.

According to a further aspect of the present invention, a method is provided for dismantling of a windshield wiper device in accordance with the embodiments which are described here. The method comprises releasing a non-positive connection and/or positively locking connection between the first engagement means and the second engagement means; and moving the mounting unit and the wiper blade-side fastening part away from one another in a direction substantially along the longitudinal extent of the wiper blade, in order to release the mounting unit and the wiper blade-side fastening part from one another.

Preferred embodiments and special aspects of the invention result from the dependent claims, the drawings and the present description.

In accordance with the present disclosure, a windshield wiper device is provided which can be mounted and dismantled in a simple way. The windshield wiper device which is preferably of the fin ray type can be mounted and dismantled by way of a single movement. Accordingly, the windshield wiper device and, in particular, the wiper blade can be exchanged simply in the case of damage or can be removed in a simple way before passing through a car wash and can subsequently be mounted again.

In accordance with embodiments of the present disclosure, a windshield wiper device for a vehicle, in particular a motor vehicle, comprising a wiper blade is specified. The wiper blade comprises an elongate upper part which is of at least partially flexible configuration, an elongate lower part which is of at least partially flexible configuration, a plurality of connecting elements for connecting the upper part and the lower part, the connecting elements being spaced apart from one another along a longitudinal extent of the wiper blade and being attached on the upper part and/or on the lower part by means of a rotary joint, the connecting elements being designed, in particular, for making a movement of the upper part and the lower part relative to one another possible, with a movement component along the longitudinal extent of the wiper blade. A windshield wiper device having a wiper blade of this type can be called a "fin ray". Windshield wiper devices of the fin ray type are distinguished by particularly high flexibility and satisfactory adaptation to the curvature and curvature changes of the window to be wiped.

In accordance with embodiments, the mounting unit has a first opening, through which the wiper blade-side fastening part can be introduced at least partially into the mounting unit. In other embodiments, the wiper blade-side fastening part has the first opening, through which the mounting unit can be introduced at least partially into the wiper blade-side fastening part. Therefore, the wiper blade can be mounted on the mounting unit in a simple way.

In some embodiments, the first engagement means is an opening, for example a second opening, a circumferential region of the second opening being designed for engaging with the second engagement means and, in particular, for forming a non-positive and/or positively locking connection with the second engagement means. In other embodiments, the second engagement means is the second opening, the circumferential region of the second opening being designed for engaging with the first engagement means and, in particular, for forming a non-positive and/or positively locking connection with the first engagement means. Therefore, the wiper blade and the mounting unit can be connected to one another in a simple way and, in particular, can be connected to one another releasably.

In accordance with embodiments which can be combined with other embodiments which are described here, the windshield wiper device comprises an actuating apparatus, the engagement between the first engagement means of the mounting unit and the second engagement means of the wiper blade-side fastening part being releasable by way of actuation of the actuating apparatus. For example, the actuating apparatus can comprise the first engagement means or the second engagement means, the actuating apparatus and the first engagement means or the second engagement means being able to be configured in one piece, in particular. Therefore, the windshield wiper device can be manufactured simply and inexpensively.

The actuating apparatus can typically be configured as a button or pushbutton. Therefore, for example, the non-positive connection and/or positively locking connection between the first engagement means and the second engagement means can be released in a simple manner, in particular by way of pressing of the pushbutton.

In accordance with some embodiments which can be combined with other embodiments which are described here, the wiper blade-side fastening part is arranged or mounted on the wiper blade so as to be rotatable about an axis of rotation, in particular wherein the axis of rotation is substantially perpendicular to the longitudinal extent of the wiper blade. The windshield wiper device typically comprises a rotary joint which connects the wiper blade-side fastening part and the wiper blade rotatably to each other, and in particular wherein the rotary joint provides the axis of rotation. As a result, good adaptation to the curvature and changes in curvature of the window to be wiped can be achieved.

In typical embodiments, the windshield wiper device comprises an elastic element which is arranged between the wiper blade-side fastening part and the wiper blade. The elastic element can comprise, for example, a compression spring or can be a compression spring. A contact pressure of the windshield wiper device, and in particular of the wiper blade, against the window of the vehicle can therefore be provided, and an improved wiping effect can be achieved.

BRIEF DESCRIPTION OF THE DRAWINGS

Exemplary embodiments of the invention are shown in the figures and will be described in greater detail in the following text. In the figures:

FIG. 7 shows a diagrammatic illustration of a windshield wiper device in accordance with other embodiments of the disclosure, in a basic position, and FIG. 8 shows a diagrammatic illustration of the windshield wiper device according to FIG. 7, in a position in which it is set against a window.

DETAILED DESCRIPTION

In the following text, unless otherwise noted, identical designations are used for identical and identically acting elements.

Figure 1A:
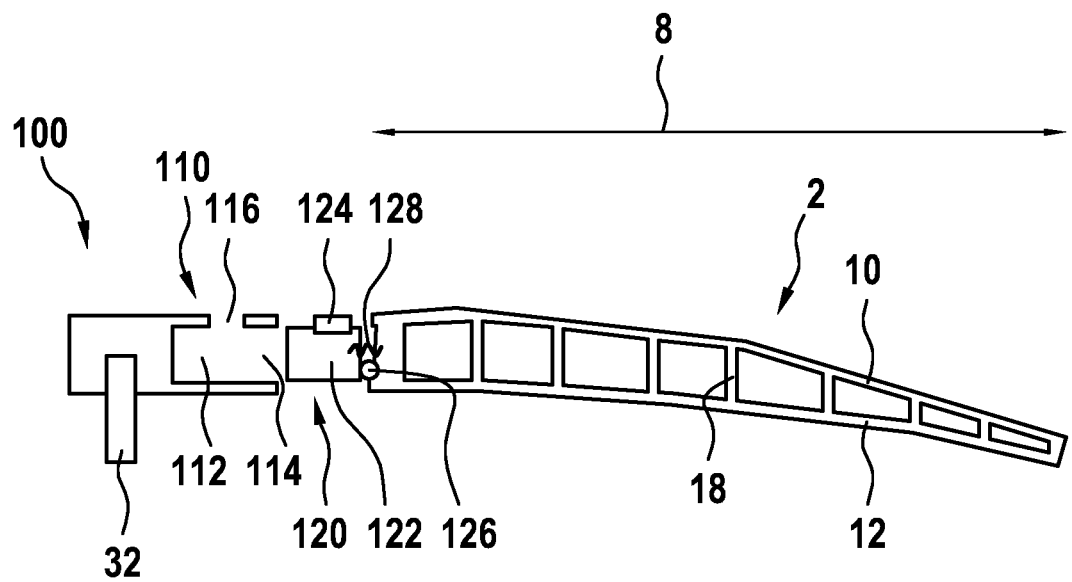
FIGS. 1A and 1B show diagrammatic illustrations of a windshield wiper device in accordance with embodiments of the disclosure.
Figure 1B:
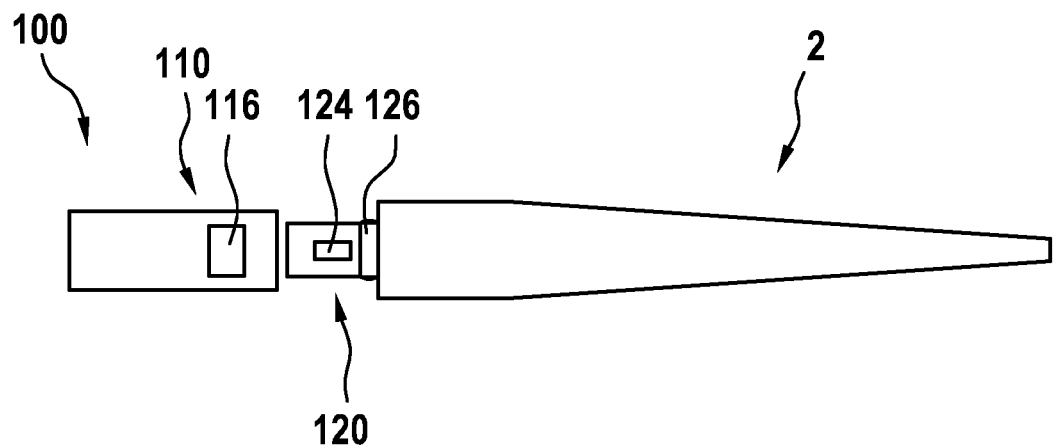

FIGS. 1A and 1B show diagrammatic illustrations of a windshield wiper device 100 in accordance with embodiments of the disclosure. FIG. 1A shows a side view of the windshield wiper device 100, and FIG. 1B shows a plan view of the windshield wiper device 100.

The vehicle comprises the fastening element 32 and the mounting unit 110 which is designed for being mounted on the fastening element 32, the mounting unit 110 having a first engagement means 116. The windshield wiper device 100 comprises a wiper blade 2 with a longitudinal extent 8, the wiper blade 2 having a wiper blade-side fastening part 120 with a second engagement means 124. The mounting unit 110 and the wiper blade-side fastening part 120 can be introduced at least partially into one another by way of a movement substantially along (and/or parallel to) the longitudinal extent 8 of the wiper blade 2, the first engagement means 116 and the second engagement means 124 being designed for engaging into one another when the mounting unit 110 and the wiper blade-side fastening part 120 are introduced into one another. According to some embodiments, the windshield wiper device 100 furthermore comprises an actuating apparatus, the engagement between the first engagement means 116 of the mounting unit 110 and the second engagement means 124 of the wiper blade-side fastening part 120 being releasable by way of an actuation of the actuating apparatus.

By means of the embodiments which are described herein, a windshield wiper device is therefore provided which can be mounted and dismantled in a simple manner. Accordingly, the windshield wiper device can be replaced simply in the case of damage or can be removed in a simple manner before passing through a car wash and can subsequently be mounted again. Furthermore, for example in the event of damage of the wiper blade, only the wiper blade has to be exchanged, and the mounting unit can be used further. As a result, maintenance costs can be reduced.

Although the vehicle can comprise the mounting unit in the examples which are shown here, it is to be understood that the windshield wiper device can also comprise the mounting unit which is described here.

As shown by way of example in FIGS. 1A and 1B, the mounting unit 110 in accordance with embodiments can be connected to the fastening element 32 or can be fastened to the latter. To this end, the fastening element 32 can be introduced, for example, into the mounting unit 110. The fastening element 32 and the mounting unit 110 can be connected to one another, for example, by way of a non-positive and/or positively locking connection, and can be connected to one another releasably, in particular. The fastening element 32 can be, for example, a drive shaft which is connected to a wiper motor or is driven by the latter.

In accordance with embodiments, the wiper blade 2 has an elongate upper part 10 and an elongate lower part 12 which are of at least partially flexible configuration, the lower part 12 facing a window during operation of the windshield wiper device. Furthermore, a plurality of connecting elements 18 are provided for connecting the upper part 10 and the lower part 12, the connecting elements 18 being spaced apart from one another along the longitudinal extent 8 of the wiper blade and being attached on the upper part 10 and/or the lower part 12 by means of a rotary joint. The connecting elements 18 are designed for making a movement of the upper part 10 and the lower part 12 relative to one another possible, with a movement component along the longitudinal extent 8 of the wiper blade 2. Here, the connecting elements are connected on the upper part 10 at a respective upper connecting position and on the lower part 12 at a respective lower connecting position. For example, in each case one rotary joint is provided at the connecting positions. In the case of a movement of the upper part 10 and the lower part 12 relative to one another, the spacing of an upper connecting position from a lower connecting position on the same connecting element does not change substantially, that is to say the spacing is constant with deviations of, for example, ±1 mm, in particular ±0.3 mm.

A windshield wiper device having a wiper blade of this type can be called a "fin ray". Windshield wiper devices of the fin ray type are distinguished by a particularly high flexibility and satisfactory adaptation to the curvature and curvature changes of the window to be wiped.

In accordance with embodiments, the mounting unit 110 has a first opening 114, through which the wiper blade-side fastening part 120 can be introduced at least partially into the mounting unit 110. The first opening 114 can be, for example, an opening to a receiving region 112 of the mounting unit 110. Therefore, the wiper blade 2 can be mounted on the mounting unit 110 in a simple way. For example, the mounting unit 110 can have a cutout or the receiving region 112, and the wiper blade-side fastening part 120 can have a main body 122. For example, the main body 122 of the wiper blade-side fastening part 120 can be capable of being inserted into the cutout or the receiving region 112. The main body 122 and/or the cutout or the receiving region 112 can have a substantially rectangular shape.

The present disclosure is not restricted hereto, however, and the wiper blade-side fastening part can have the first opening in other embodiments, through which first opening the mounting unit can be introduced at least partially into the wiper blade-side fastening part.

In some embodiments, the first engagement means 116 is a second opening, a circumferential region of the second opening being designed for engaging with the second engagement means 124 and, in particular, for forming a non-positive and/or positively locking connection with the second engagement means 124. The first engagement means 116 can be configured, for example, on an upper side of the mounting unit 110. The upper side of the mounting unit 110 can be in particular a side or surface of the mounting unit 110 that faces away from the vehicle window.

The present disclosure is not restricted hereto, however, and the second engagement means is the second opening in other embodiments, the circumferential region of the second opening being designed for engaging with the first engagement means and, in particular, for forming a non-positive and/or positively locking connection with the first engagement means. Therefore, the wiper blade 2 and the mounting unit 110 can be connected to one another in a simple way, and can be connected releasably to one another, in particular. In typical embodiments, the first engagement means 116 and the second engagement means 124 can be configured as a latching mechanism and/or as a click-action mechanism.

In accordance with embodiments of the disclosure which can be combined with other embodiments, "non-positive connection" is understood to mean all connections which are produced by way of the transmission of forces (for example, non-positive connections, frictional connection). In particular, connections of this type use pressure forces and/or frictional forces. The cohesion of said connections is achieved by way of the force which acts.

In accordance with embodiments of the disclosure which can be combined with other embodiments, "positively locking connection" is understood to mean all connections which are produced by way of an engagement of at least two elements into one another (positively locking connections). In particular, the elements cannot be released by way of the mechanical connection, even without a transmission of force or in the case of an interrupted transmission of force.

In accordance with embodiments which can be combined with other embodiments which are described here, the actuating apparatus comprises the first engagement means or the second engagement means, the actuating apparatus and the first engagement means or the second engagement means being configured in one piece, in particular. In the example of FIGS. 1A and 1B, the actuating apparatus and the second engagement means 124 of the wiper blade-side fastening part 120 are configured in one piece or integrally. Therefore, the windshield wiper device 100 can be manufactured simply and inexpensively. The actuating apparatus can typically be configured as a button or pushbutton.

In accordance with some embodiments which can be combined with other embodiments which are described here, the wiper blade-side fastening part 120 is arranged or mounted on the wiper blade 2 so as to be rotatable about an axis of rotation, in particular wherein the axis of rotation is substantially perpendicular to the longitudinal extent 8 of the wiper blade 2. The windshield wiper device 100 typically comprises a rotary joint 126 which connects the wiper blade-side fastening part 120 and the wiper blade 2 rotatably to each other, and in particular wherein the rotary joint 126 provides the axis of rotation. The axis of rotation permits a relative movement between the wiper blade-side fastening part 120 and the wiper blade 2, as a result of which, for example, good adaptation to the curvature and changes in curvature of the window to be wiped can be achieved.

In typical embodiments, the windshield wiper device 100 comprises an elastic element 128 which is arranged between the wiper blade-side fastening part 120 and the wiper blade 2. For example, the elastic element 128 can be arranged above the rotary joint 126. The elastic element 128 can comprise, for example, a compression spring or can be a compression spring. In accordance with embodiments, the elastic element 128 can be configured in order to push the wiper blade-side fastening part 120 and the wiper blade 2 away from each other or apart. A contact pressure of the windshield wiper device 100, and in particular of the wiper blade 2 or of a wiper lip (not shown) mounted on the lower side 12 of the wiper blade 2, against the window of the vehicle can therefore be provided, and an improved wiping effect can be achieved.

By means of the embodiments described here, a windshield wiper device is therefore provided which can be mounted and dismantled in a simple manner. Accordingly, the wiper blade of the windshield wiper device can be replaced simply in the case of damage or can be removed in a simple manner before passing through a car wash and can subsequently be mounted again.

Figure 2:
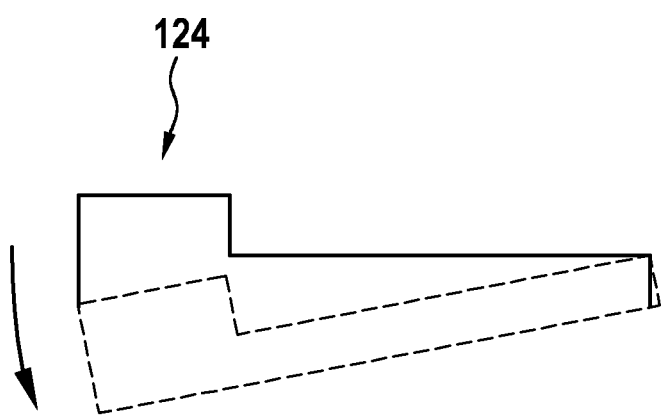
FIG. 2 shows a diagrammatic illustration of an actuating apparatus of the windshield wiper device in accordance with embodiments of the disclosure.

FIG. 2 shows a diagrammatic illustration of the actuating apparatus of the windshield wiper device 100 in accordance with embodiments of the disclosure.

The actuating apparatus can typically be configured as a button or pushbutton. Therefore, for example, non-positive connection and/or positively locking connection between the first engagement means and the second engagement means can be released in a simple way, in particular by way of pressing of the pushbutton. Accordingly, the windshield wiper device 100 can be replaced simply in the case of damage or can be removed in a simple way before passing through a car wash and can be mounted again subsequently.

In accordance with embodiments of the disclosure which can be combined with other embodiments, the actuating apparatus comprises or is the second engagement means 124. The second engagement means 124 can typically be configured as a projection. The actuating apparatus can be of at least partially elastic configuration. The projection can be in engagement with the first engagement means in the mounted state of the windshield wiper device 100, it being possible for the projection to be lowered by way of pressing of the actuating apparatus, in order thus to release the engagement between the projection and the first engagement means.

Figure 3A:
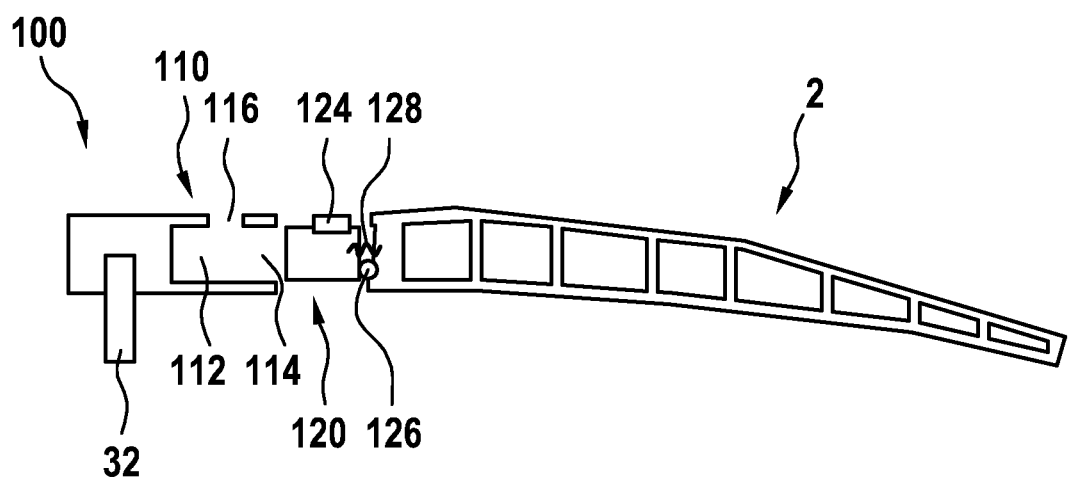
FIGS. 3A and 3B show a diagrammatic illustration of the mounting of a windshield wiper device in accordance with embodiments of the disclosure.
Figure 3B:
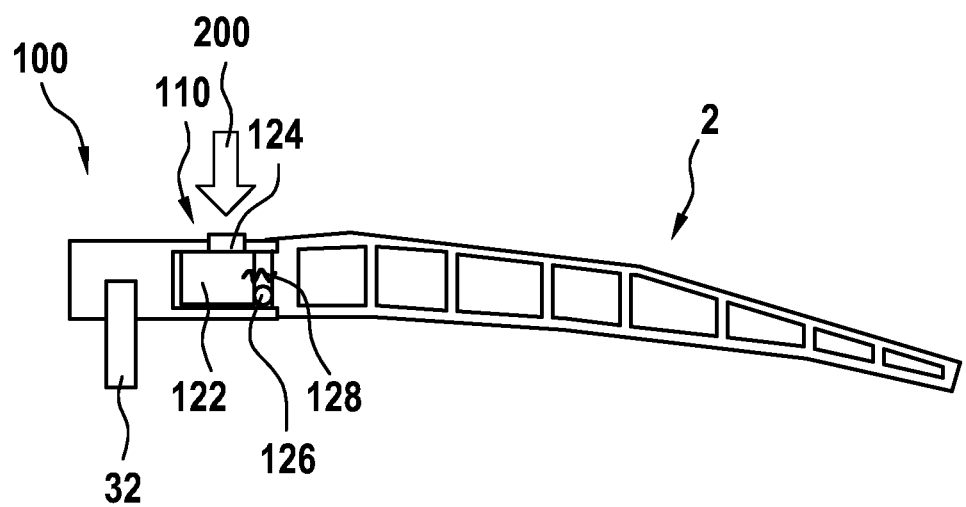

FIGS. 3A and 3B show a diagrammatic illustration of the mounting of a windshield wiper device 100 in accordance with embodiments of the disclosure.

In accordance with one aspect of the present invention, a method for mounting the windshield wiper device 100 in accordance with the embodiments which are described here is provided. The method comprises at least partial introduction of the mounting unit 110 and the wiper blade-side fastening part 120 into one another by way of a movement substantially along the longitudinal extent of the wiper blade 2; and a formation of a non-positive connection and/or positively locking connection between the first engagement means 116 and the second engagement means 124. Typically, the actuating apparatus can be pressed, as indicated in FIG. 3B with the arrow 200, in order to release the non-positive connection and/or positively locking connection.

Figure 4A:
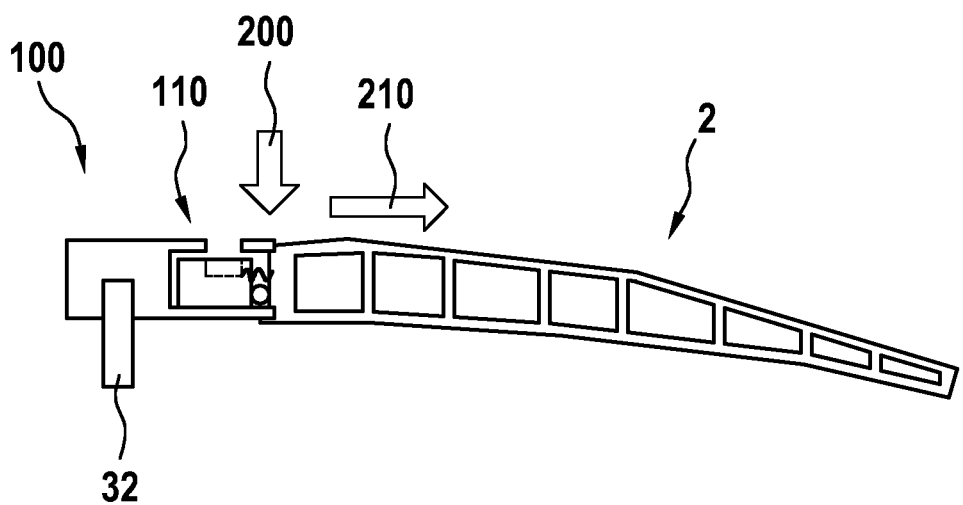
FIGS. 4A and 4B show a diagrammatic illustration of the dismantling of a windshield wiper device in accordance with embodiments of the disclosure.
Figure 4B:
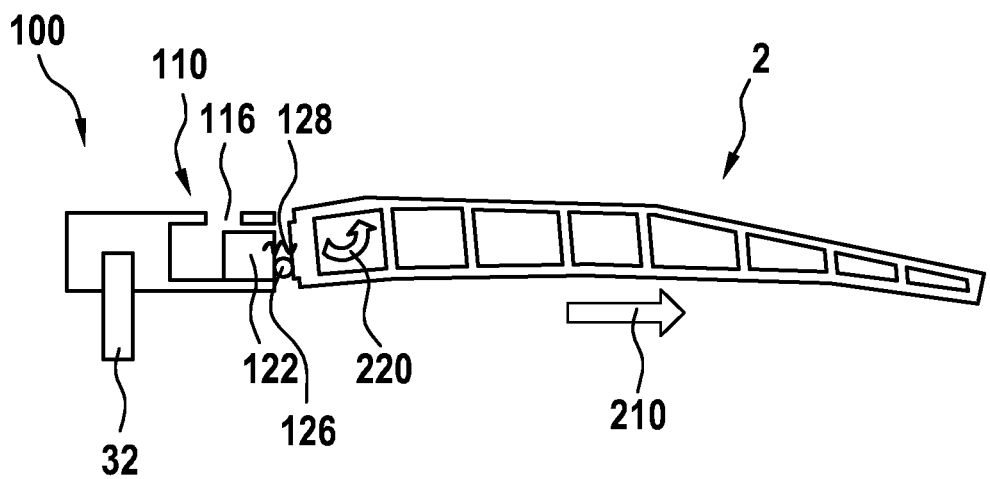

FIGS. 4A and 4B show a diagrammatic illustration of the dismantling of a windshield wiper device 100 in accordance with embodiments of the disclosure.

According to a further aspect of the present invention, a method is provided for dismantling the windshield wiper device 100 in accordance with the embodiments described here. The method comprises releasing a non-positive connection and/or positively locking connection between the first engagement means 116 and the second engagement means 124, for example by pressing the actuating apparatus (indicated with the arrow 200); and moving the mounting unit 110 and the wiper blade-side fastening part 120 apart from one another in a direction 210 substantially along the longitudinal extent 8 of the wiper blade 2, in order to release the mounting unit 110 and the wiper blade-side fastening part 120 from one another.

Typically, the wiper blade 2 can be rotated about the rotary joint 126, as indicated by the arrow 220, for the dismantling. The wiper blade 2 with the wiper blade-side fastening part 120 can then be released in a simple manner from the mounting unit 110 and removed.

Figure 5:
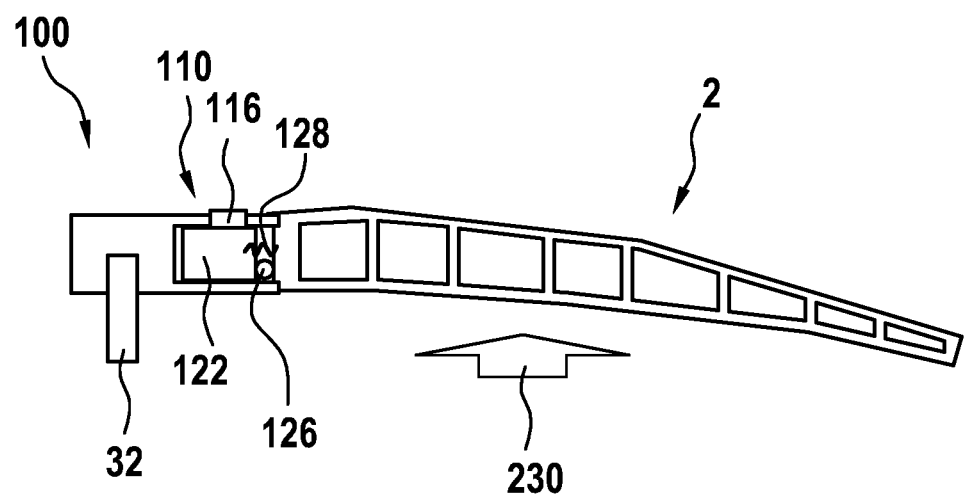
FIG. 5 shows a diagrammatic illustration of a mounted windshield wiper device in accordance with embodiments of the disclosure.

FIG. 5 shows a diagrammatic illustration of a mounted windshield wiper device 100 in accordance with embodiments of the disclosure.

In typical embodiments, the windshield wiper device 100 comprises the elastic element 128, for example a compression spring, which is arranged between the wiper blade-side fastening part 120 and the wiper blade 2. According to embodiments, the elastic element 128 can be configured in order to press the wiper blade-side fastening part 120 and the wiper blade 2 away from each other or apart. As a result, the elastic element 128 can provide a (pre-)stressing force 230. Therefore, a contact pressure on the window of the vehicle of the windshield wiper device 100 and, in particular, of the wiper blade 2 or of a wiper lip (not shown) which is mounted on the underside of the wiper blade 2 can be provided, and an improved wiping effect can be achieved.

In accordance with embodiments, the (pre-)stressing force 230 can provide a securing function for the windshield wiper device 100. When the actuating apparatus is activated, the (pre-)stressing force 230 can press the wiper blade 2 upward. The structure is secured/fixed, as a result of which falling out or falling down of the wiper blade 2 is prevented.

In the following text, aspects of an exemplary windshield wiper device will be described, for which the embodiments of the windshield wiper device which are described herein are particularly advantageous. The fastening apparatus which is described herein can in principle also be used for other windshield wiper devices, however.

In order to provide the "fin ray" effect which is described in greater detail in the following text with reference to FIGS. 6A and 6B, 7 and 8, the connecting elements 18 are designed, above all, to be movable about an associated connecting point 20, for making a movement of the upper part 10 and the lower part 12 relative to one another possible, with a movement component along the longitudinal extent 8 of the wiper blade 2.

Figure 6A:
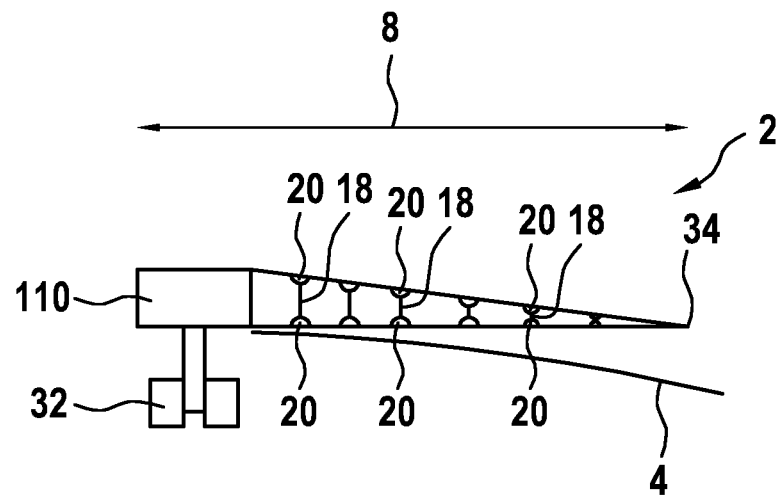
FIG. 6A shows a diagrammatic illustration of a windshield wiper device in accordance with embodiments of the disclosure, in a basic position.
Figure 6B:
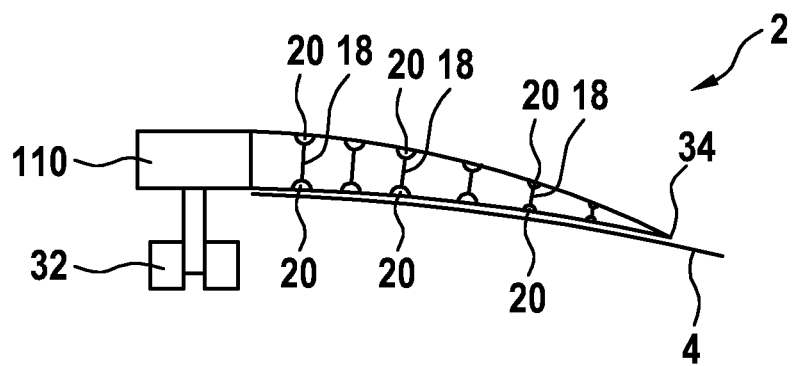
FIG. 6B shows a diagrammatic illustration of the windshield wiper device according to FIG. 6A, in a position in which it is set against a window.

FIGS. 6A and 6B show diagrammatic illustrations of a wiper blade 2 in a basic position and in a position in which it is set against a window 4, in accordance with embodiments of the windshield wiper device of the disclosure. The wiper blade 2 serves for wiping the window 4 of a vehicle which is, for example, a motor vehicle, in particular a car. The wiper blade 2 has a longitudinal extent 8 and has an elongate upper part 10 and a likewise elongate lower part 12. The longitudinal extents of the upper part 10 and of the lower part 12 correspond substantially to the longitudinal extent 8 of the wiper blade 2.

Both the upper part 10 and the lower part 12 are flexible bars or can be configured as flexible bars. It is likewise possible to configure only in each case one part of the upper part 10 and/or of the lower part 12 to be flexible. In accordance with some embodiments which can be combined with the other embodiments which are described here, a material is used for the upper part 10 and/or the lower part 12, which material has a modulus of elasticity which lies in a range between 0.005 $kN/mm^2$ and 0.5 $kN/mm^2$, in particular between 0.01 $kN/mm^2$ and 0.1 $kN/mm^2$. This makes a suitable flexural capability of the upper part 10 and of the lower part 12 possible. Together with a cross-sectional area of the upper part 10 and of the lower part 12 of suitable configuration, this thus results in an optimum flexural stiffness.

Furthermore, FIGS. 6A and 6B show the mounting unit 110, on which the wiper blade 2 is attached. The mounting unit 110 is connected to a wiper motor which drives the windshield wiper device for wiping the window 4. The mounting unit 110 can be configured in accordance with the embodiments of the present disclosure. Furthermore, the wiper motor can be connected to the fastening element 32 which can be a drive shaft.

On the side which lies opposite the mounting unit 110 along the longitudinal extent 8 of the windshield wiper device, the upper part 10 and the lower part 12 are connected at the connecting position 34. The upper part 10 and the lower part 12 are connected to one another by way of connecting elements 18. The connecting elements 18 are configured in such a way that the spacing of the connecting position to the upper part 10 and the spacing of the connecting position to the lower part 12 change by at most ±1 mm, in particular change by at most ±0.3 mm (for example, as a result of thermal expansion and/or tensile and compressive loading). The connecting elements 18 can therefore be of substantially non-elastic configuration and/or the effect of the connecting elements 18 is based on their transmission of force between the upper part 10 and the lower part 12 and not on their elasticity.

The connecting elements 18 are fastened by means of rotary joints 20 to mutually facing inner longitudinal sides of the upper part 10 and the lower part 12. The rotary joints 20 are typically hinges. In particular, the rotary joints 20 can be configured as integral hinges. This is advantageous, above all, when the upper part 10, the lower part 12 and/or the connecting elements 18 are/is manufactured from a plastic material or are/is coated with a suitable plastic material.

In accordance with typical embodiments which are described here and can be combined with other embodiments which are described here, a rotary joint 20 is selected from the following group which consists of: a hinge, an integral hinge, a tapered portion of the material in order to produce lower stiffness along a torsional axis, a joint with a rotational axis, a means for connecting the upper part to the connecting element or for connecting the lower part to the connecting element, which permits the displacement of the lower part in relation to the upper part along the longitudinal extent, etc.

Embodiments, in which the joints 20 are provided by way of integral hinges, therefore provide a very simple way of providing the joints 20 for a fin ray wiper. The wiper blade 2 can be provided in one piece, in particular without the use of tools. In accordance with typical embodiments, the integral hinges have a high elasticity. This can be provided, for example, by way of a material selected from the group comprising PP, PE, POM and PA. As an alternative, the integral hinges can be manufactured from one or more materials from a group consisting of: TPE (thermoplastic elastomer), for example TPE-S, TPE-O, TPE-U, TPE-A, TPE-V and TPE-E.

The connecting elements 18 are spaced apart from one another along the longitudinal extent 8 of the wiper blade 2. The spacings are advantageously smaller than 50 mm, in particular smaller than 30 mm. As a result, particularly high flexibility of the windshield wiper device, in particular of its lower part 12, and satisfactory adaptation to the curvature and curvature changes of the window 4 to be wiped can be ensured.

FIG. 6B shows a diagrammatic illustration of the wiper blade 2 according to FIG. 6A in a position in which it is set against the window 4. Since the window 4 has a curvature, contact pressure forces act on the lower part 12 when the wiper blade 2 bears against the window 4. Since the upper part 10 and the lower part 12 are flexible bars and the connecting elements 18 are mounted rotatably on the upper part 10 and the lower part 12, the upper part 10 and the lower part 12 can be displaced with respect to one another. As a result of the pressure forces which act from below on the lower part 12, the wiper blade 2 bends in that direction, from which the pressure forces come, and bears precisely against the curvature of the window 4.

As a result of the construction of the embodiments which are described here, bending of the lower part 12 takes place in the direction, from which the force acts, in the case of an action of force on the lower part 12 (by way of the window 4). This is as a result of the connection of the upper part 10 and of the lower part 12 at the connecting position 34, the shape, and as a result of rotary joints 20 at the connection between the connecting elements 18 and the upper and lower part. A windshield wiper device in accordance with embodiments which are described here utilizes the effect of tailfins of certain fish, which tailfins do not yield in the direction of pressure in the case of lateral pressure, but rather curve in the opposite direction, that is to say in the direction, from which the pressure comes. This principle is also called the "fin ray" principle. As a result, a windshield wiper device in accordance with the embodiments which are described herein has the advantage of improved adaptation to a window 4 of a motor vehicle. In the case of a conventional windshield wiper blade, the upper part thereof is usually rigid, that is to say it is not of flexible configuration.

FIGS. 7 and 8 show diagrammatic illustrations of a wiper blade 2 of a windshield wiper device for a vehicle, in particular for a motor vehicle, in a basic position (FIG. 7), that is to say in an unloaded state, and in a position in which it is set against a window 4 (FIG. 8) in accordance with the embodiments which are described herein. The wiper blade 2 comprises an elongate upper part 10 and an elongate lower part 12 which are of at least partially flexible configuration. Furthermore, a plurality of connecting elements 18 are provided for connecting the upper part 10 and the lower part 12, the connecting elements 18 being spaced apart from one another along the longitudinal extent 8 of the wiper blade 2. The connecting elements 18 are designed for making a movement of the upper part 10 and the lower part 12 relative to one another possible, with a movement component along the longitudinal extent 8 of the wiper blade 2. Furthermore, the connecting elements 18 are arranged relative to the lower part 12 in such a way that, in an unloaded state of the wiper blade 2, an angle $\alpha n$ of the respective longitudinal axes 24 of the connecting elements 18 relative to the lower part 12 changes at least partially along the longitudinal extent 8 of the wiper blade 2, in particular changes continuously or changes monotonously or strictly monotonously.

In the unloaded state in the wiper blade 2 which is shown in FIG. 7, the angles $\alpha n$ of the respective longitudinal axes 24 of the connecting elements 18 relative to the lower part 12 which change along the longitudinal extent 8 of the wiper blade 2 are denoted by $\alpha 1, \alpha 2, \alpha 3, \ldots \alpha n-1, \alpha n$. In a loaded state of the wiper blade 2, that is to say in a position in which it is set against the window 4, as shown by way of example in FIG. 8, the angles $\alpha n$ of the respective longitudinal axes 24 of the connecting elements 18 relative to the lower part 12 change in comparison with the unloaded state. In order to express this, the angles $\alpha n$ of the respective longitudinal axes 24 of the connecting elements 18 relative to the lower part 12 which change along the longitudinal extent 8 of the wiper blade 2 are denoted by $\alpha 1, \alpha 2, \alpha 3, \ldots \alpha n-1, \alpha n$ in the wiper blade 2 which is shown in FIG. 8 and is situated in a position in which it is set against the window 4.

In accordance with embodiments of the windshield wiper device which can be combined with other embodiments, the wiper blade 2 has at least one first region, in which the angle $\alpha n$ of the longitudinal axes 24 of the connecting elements 18 relative to the lower part 12 decreases along the longitudinal extent 8 of the wiper blade 2 toward a wiper blade end, in particular decreases monotonously, in particular strictly monotonously. Furthermore, the wiper blade 2 can have at least one second region, in which the angle αn of the longitudinal axes 24 of the connecting elements 18 relative to the lower part 12 increases along the longitudinal extent 8 of the wiper blade 2 toward a wiper blade end, in particular increases monotonously, in particular strictly monotonously. In accordance with embodiments, as shown by way of example in FIGS. 7 and 8, the second region of the wiper blade 2, in which second region the angle αn of the longitudinal axes 24 of the connecting elements 18 relative to the lower part 12 increases along the longitudinal extent 8 of the wiper blade 2 toward a wiper blade end, is arranged at an inner position of the wiper blade which is situated in the vicinity of the mounting unit 110 or the wiper blade-side fastening part (not shown) of the wiper blade 2. As a result, a windshield wiper device can be provided which makes particularly satisfactory adaptation to the curvature of a window 4 possible. Furthermore, a largely uniform contact pressure of the windshield wiper device on the window 4 and a homogeneous distribution of forces of the windshield wiper device can be provided, with the result that a high wiping quality is provided.

In accordance with embodiments of the wiper blade 2 which can be combined with other embodiments, the connecting elements 18 are fastened to the lower part 12, in particular in an unloaded state of the wiper blade 2, in such a way that the longitudinal axes 24 of the connecting elements 18 run at angles αn with respect to the lower part 12, which angles αn lie between a lower angle limit value αnu and an upper limit value αno. In accordance with embodiments, the lower angle limit value αnu=10°, in particular αnu=15°, in particular αnu=20°, and the upper angle limit value αno=80°, in particular αno=90°, in particular αno=100°. This advantageously ensures a particularly satisfactory transmission of a force which acts on the lower part 12 to the upper part 10.

In accordance with embodiments of the windshield wiper device which can be combined with other embodiments, the connecting elements 18 are configured in such a way that the spacing between the upper part 10 and the lower part 12 changes at least partially along the longitudinal extent 8 of the wiper blade 2, in particular decreases continuously in a first region and increases continuously in a second region. The spacing between the upper part 10 and the lower part 12 along the longitudinal extent 8 of the wiper blade 2 can also comprise a region, in which the spacing between the upper part 10 and the lower part 12 is substantially constant along the longitudinal extent 8 of the wiper blade 2. The spacing between the upper part 10 and the lower part 12 of the mounting unit 110 or the wiper blade-side fastening part is greater than at the opposite end, at which the connecting position 34 is situated.

In accordance with embodiments of the wiper blade 2 which can be combined with other embodiments, the inner spacing value (facing the wiper blade-side fastening part) is at least 15 mm, in particular at least 25 mm, in particular at least 35 mm. In accordance with embodiments which can be combined with other embodiments, the outer spacing value is at least 10 mm, in particular at least 12.5 mm, in particular at least 15 mm. In accordance with embodiments which can be combined with other embodiments, the mean spacing value is at least 7.5 mm, in particular at least 9 mm, in particular at least 12.5 mm.

As shown by way of example in FIGS. 7 and 8, the connecting elements 18 in accordance with embodiments which can be combined with other embodiments are connected in an articulated manner to the lower part 12 and/or the upper part 10. In particular, the connecting elements 18 are connected to the lower part 12 and/or the upper part 10 by means of a first integral hinge 20. The first integral hinge 20 can be configured in one piece with the connecting element 18 and the upper part 10 and/or the lower part 12. The single-piece configuration of the integral hinges permits simple and inexpensive manufacture.

In accordance with embodiments of the wiper blade which can be combined with other embodiments which are described herein, the wiper blade 2 comprises a first region with a first curvature ω<0 and a second region with a second curvature ω>0. Furthermore, the wiper blade in accordance with embodiments can have a third region with a third curvature ω<0, the second region of the wiper blade 2 with the second curvature ω>0 being arranged between the first region with the first curvature ω<0 and the third region with the third curvature ω<0, as shown by way of example in FIG. 7. Therefore, a windshield wiper device can be provided, by way of which a largely uniform contact pressure on the window 4 can be realized. Furthermore, a windshield wiper device can be provided which has improved adaptation to the window 4 and a high wiping quality.

The embodiments described here specify a windshield wiper device which can be mounted and dismantled in a simple manner. Accordingly, the windshield wiper device can be replaced simply in the case of damage or can be removed in a simple manner before passing through a car wash and can subsequently be mounted again.

What is claimed is:

1. A windshield wiper device (100) for a vehicle having a fastening element (32) and a mounting unit (110) which is configured for being mounted on the fastening element (32), the mounting unit (110) having a first engagement means (116), the windshield wiper device (100) comprising:
a wiper blade (2) with a longitudinal extent (8), the wiper blade (2) having a wiper blade-side fastening part (120) with a second engagement means (124), the mounting unit (110) and the wiper blade-side fastening part (120) being configured to be introduced at least partially into one another by a movement substantially along the longitudinal extent (8) of the wiper blade (2), the first engagement means (116) and the second engagement means (124) being configured for engaging into one another when the mounting unit (110) and the wiper blade-side fastening part (120) are introduced into one another, and the engagement between the first engagement means (116) of the mounting unit (110) and the second engagement means (124) of the wiper blade-side fastening part (120) being releasable, the wiper blade (2) further including an elastic element (128) which is arranged between surfaces facing one another of the wiper blade-side fastening part (120) and a remainder of the wiper blade (2) and which is configured to push a portion of the wiper blade-side fastening part (120) away from the remainder of the wiper blade (2) along the longitudinal extent (8), the wiper blade (2) further including a rotary joint (126) spaced from and to one side only of the elastic element (128) along a direction perpendicular to the longitudinal extent (8), wherein the rotary joint (126) connects the wiper blade-side fastening part (120) and the remainder of wiper blade (2) rotatably to each other.

2. The windshield wiper device (100) as claimed in claim 1, the wiper blade (2) comprising:
- an elongate upper part (10) which is of at least partially flexible configuration,
- an elongate lower part (12) which is of at least partially flexible configuration, and
- a plurality of connecting elements (18) for connecting the upper part (10) and the lower part (12), the connecting elements (18) being spaced apart from one another along the longitudinal extent (8) of the wiper blade (2) and being attached on the upper part (10) and/or on the lower part (12) by means of a further rotary joint (20).

3. The windshield wiper device (100) as claimed in claim 2, the connecting elements (18) being configured for making a movement of the upper part (10) and the lower part (12) relative to one another possible with a movement component along the longitudinal extent (8) of the wiper blade (2).

4. The windshield wiper device (100) as claimed in claim 1, the mounting unit (110) having a first opening (114), through which the wiper blade-side fastening part (120) is configured to be introduced at least partially into the mounting unit (110).

5. The windshield wiper device (100) as claimed in claim 4, the first engagement means (116) being a second opening, a circumferential region of the second opening being configured for engaging with the second engagement means (124).

6. The windshield wiper device (100) as claimed in claim 1, comprising an actuating apparatus, engagement between the first engagement means (116) of the mounting unit (110) and the second engagement means (124) of the wiper blade-side fastening part (120) being releasable by an actuation of the actuating apparatus.

7. The windshield wiper device (100) as claimed in claim 6, the actuating apparatus comprising the first engagement means (116) or the second engagement means (124).

8. The windshield wiper device (100) as claimed in claim 6, the actuating apparatus being configured as a button or pushbutton.

9. The windshield wiper device (100) as claimed in claim 6, the actuating apparatus comprising the first engagement means (116) or the second engagement means (124), and the actuating apparatus and the first engagement means (116) or the second engagement means (124) being configured in one piece.

10. The windshield wiper device (100) as claimed in claim 1, wherein the wiper blade-side fastening part (120) is arranged on the wiper blade (2) so as to be rotatable about an axis of rotation.

11. The windshield wiper device (100) as claimed in claim 1, the elastic element (128) comprising a compression spring configured to push the portion of the wiper blade-side fastening part (120) away from the wiper blade (2) along the longitudinal extent (8).

12. A method (700) for mounting a windshield wiper device (100) as claimed in claim 1, comprising:
- introducing the mounting unit (110) and the wiper blade-side fastening part (120) at least partially into one another by a movement substantially along the longitudinal extent (8) of the wiper blade (2); and
- forming a non-positive connection and/or positively locking connection between the first engagement means (116) and the second engagement means (124).

13. A method for dismantling a windshield wiper device (100) as claimed in claim 1, comprising:
- releasing a non-positive connection and/or positively locking connection between the first engagement means (116) and the second engagement means (124); and
- moving the mounting unit (110) and the wiper blade-side fastening part (120) apart from one another in a direction substantially along the longitudinal extent (8) of the wiper blade (2), in order to release the mounting unit (110) and the wiper blade-side fastening part (120) from one another.

14. The windshield wiper device (100) as claimed in claim 1, further comprising the mounting unit, the first engagement means (116) being a second opening, a circumferential region of the second opening being configured for engaging with the second engagement means (124) and for forming a non-positive and/or positively locking connection with the second engagement means (124).

15. The windshield wiper device (100) as claimed in claim 1, wherein the wiper blade-side fastening part (120) is arranged on the wiper blade (2) so as to be rotatable about an axis of rotation, wherein the axis of rotation is substantially perpendicular to the longitudinal extent (8) of the wiper blade (2).

16. The windshield wiper device (100) as claimed in claim 15, wherein the rotary joint (126) connects the wiper blade-side fastening part (120) and the wiper blade (2) rotatably to each other, and wherein the rotary joint (126) provides the axis of rotation.

* * * * *